United States Patent
Iwasaki et al.

(10) Patent No.: US 8,084,376 B2
(45) Date of Patent: Dec. 27, 2011

(54) CARRIER MEMBER AND SUPPORT MEMBER

(75) Inventors: Tomonori Iwasaki, Sanda (JP); Osamu Matsumoto, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/151,293

(22) Filed: Jun. 14, 2005

(65) Prior Publication Data

US 2006/0013613 A1    Jan. 19, 2006

(30) Foreign Application Priority Data

Jun. 30, 2004   (JP) ............................. P 2004-195004

(51) Int. Cl.
*B32B 27/04*   (2006.01)
*D04B 7/24*    (2006.01)
*D04B 21/20*   (2006.01)

(52) U.S. Cl. .................. 442/125; 442/123; 442/312

(58) Field of Classification Search ............ 442/318, 442/123, 125, 312; 66/169 R, 196
See application file for complete search history.

(56) References Cited

U.S. PATENT DOCUMENTS

| | | | |
|---|---|---|---|
| 2,120,204 A | 6/1938 | Langhorst | |
| 2,189,730 A | 2/1940 | Esch | |
| 2,551,406 A | 5/1951 | Yent | |
| 3,027,678 A | 4/1962 | Whitney et al. | |
| 3,823,873 A | 7/1974 | Miller et al. | |
| 3,996,348 A | 12/1976 | Greenberg | |
| 4,228,124 A | 10/1980 | Kashihara et al. | |
| 6,015,570 A * | 1/2000 | Tucci et al. | 424/403 |
| 6,294,576 B1 * | 9/2001 | Mori | 514/531 |
| 6,305,875 B1 | 10/2001 | Matsumoto | |
| 6,327,813 B1 | 12/2001 | Ishiwatari | |
| 6,440,438 B2 * | 8/2002 | Platts | 424/403 |
| 6,477,865 B1 * | 11/2002 | Matsumoto | 66/195 |
| 6,630,414 B1 * | 10/2003 | Matsumoto | 442/1 |
| 6,728,969 B2 * | 5/2004 | Zeiler | 2/4 |
| 7,051,949 B2 | 5/2006 | Aiyama | |
| 7,080,412 B2 * | 7/2006 | Zeiler | 2/4 |
| 2002/0157429 A1 | 10/2002 | Matsumoto | |
| 2003/0026824 A1 | 2/2003 | Platts | |

(Continued)

FOREIGN PATENT DOCUMENTS

EP    1 184 499    3/2002

(Continued)

OTHER PUBLICATIONS

Office Action issued Aug. 12, 2010 in corresponding Japanese Application No. 2004-195004.

(Continued)

*Primary Examiner* — Jenna Johnson
(74) *Attorney, Agent, or Firm* — Wenderoth, Lind & Ponack, L.L.P.

(57) ABSTRACT

In a carrier member, a connecting fiber connects a peripheral part of an opening of a front surface layer and a peripheral part of an opening of a back surface layer, for each opening. At least one part of at least one connecting fiber is located inside a virtual space. The virtual space is a space which is surrounded with both surface layers and virtual vertical walls. The virtual vertical walls are extended, from inner edges of the peripheral part of the opening of one layer, to the other layer. The carrier member has many opportunities for a volatile component, held by the carrier member, to touch blown air so as to volatilize the volatile component.

5 Claims, 11 Drawing Sheets

U.S. PATENT DOCUMENTS

| | | |
|---|---|---|
| 2003/0044326 A1 | 3/2003 | Yamasaki et al. |
| 2003/0106346 A1 | 6/2003 | Matsumoto |
| 2004/0237599 A1 | 12/2004 | Kondou et al. |
| 2006/0060257 A1* | 3/2006 | Iwashita .................. 139/383 R |

FOREIGN PATENT DOCUMENTS

| | | |
|---|---|---|
| EP | 1 356 732 A1 | 10/2003 |
| JP | 02-074648 | 3/1990 |
| JP | 04-041753 | 2/1992 |
| JP | 06-280142 | 10/1994 |
| JP | 7-236399 | 9/1995 |
| JP | 9-059812 | 3/1997 |
| JP | 10-131008 | 5/1998 |
| JP | 2000-189032 | 7/2000 |
| JP | 2001-200239 | 7/2001 |
| JP | 2002-146657 | 5/2002 |
| JP | 2003-160778 | 6/2003 |
| JP | 2003-265085 | 9/2003 |
| WO | 02/50352 | 6/2002 |
| WO | 03/038173 | 5/2003 |

OTHER PUBLICATIONS

Statement on Submission of Publications issued Sep. 28, 2007 in Japanese Application No. 2004-023107 (with English translation).

* cited by examiner

CARRIER MEMBER AND SUPPORT MEMBER

BACKGROUND OF THE INVENTION

The present invention relates to a carrier member for holding a volatile component, and to a support member using the carrier member. The carrier member and the support member can be used for a fan-type volatilizing apparatus.

An insect-pest-control apparatus which uses a volatile insect-pest-control component as a volatile component is known. The volatile insect-pest-control component is, for example, a volatile insecticidal component or a volatile insect-pest-repellent component.

Such insect-pest-control apparatus includes two kinds of types. One is a heating-type and the other is a non-heating-type. The heating-type apparatus helps volatilization of the insect-pest-control component by a heater or combustion heat and the like. The non-heating-type apparatus volatilizes the insect-pest-control component under an ordinary temperature.

The heating-type apparatus was mainly used as a conventional insect-pest-control apparatus. However, in recent years, the non-heating-type apparatus has become remarkable instead of the heating-type apparatus, because the non-heating-type apparatus does not need a heating source and also is suited for use indoor and outdoor.

A fan-type apparatus is put into practical use as one example of the non-heating type apparatus. The fan-type apparatus has a fan and a support member. The support member holds a volatile component. In the fan-type apparatus, the fan blows airflow to the support member, so that the volatile component is released from the support member into an atmosphere.

The support member is comprised of a carrier member impregnated with the volatile component. The carrier member comprised of a corrugated paper is disclosed in the following patent document 1.

The following patent document 2 discloses a carrier member having a honeycomb frame structure.

The following patent document 3 discloses a carrier member constructed with overlapped nets. Each net is made of twisted fibers.

[Patent Document 1] JP-A-7-236399
[Patent Document 2] JP-A-2003-160778
[Patent Document 3] JP-A-2001-200239

The above carrier member or support member can be expected to exert a certain level of volatilization efficiency of a drug.

However, since the volatilization efficiency is a basic performance which is required by the support member or the carrier member, development of the support member, and the like, which has a higher volatilization efficiency is desired in the market.

SUMMARY OF THE INVENTION

An object of the present application is to provide a carrier member which can release more efficiently a volatile component to exert more sufficiently efficacy of the volatile component from a beginning stage.

A further object of the present application is to provide a support member using the above carrier member.

In order to achieve the above objects, inventors of the present application made various samples of the carrier member and repeated tests about the samples. Then, the inventors determined a knitted fabric having a specified structure suited for the carrier member. The specified structure was a three-dimensional structure provided with a lot of regular openings in a front surface layer and a back surface layer, respectively. Moreover, the inventors investigated some kinds of knitted fabrics. Then, the inventors found out that a positional relationship between connecting fibers connecting both layers and the openings fluctuated volatilization efficiency of drugs.

That is, the inventors found out that the following knitted fabric had high volatilization efficiency of drugs. The knitted fabric had a three-dimensional structure in which a connecting fiber could be seen inside an opening of a plan view.

A first invention of the present application is a carrier member for holding a volatile component. The carrier member comprises a front surface layer made of fabric, a back surface layer made of fabric, and connecting fibers interconnecting both layers. In the carrier member, each layer has a knitted fabric structure which has openings arranged regularly, and at least one part of at least one connecting fiber is located so as to be seen inside each opening in a plan view.

According to the first invention of the present application, the following effect can be obtained. That is, the carrier member has many opportunities for the volatile component to touch blown air. The carrier member generates a small turbulence inside the carrier member. The carrier member can assure much air volume which passes through the carrier member. Therefore, the carrier member is superior in terms of ability to volatilize the volatile component held by the carrier member.

A second invention of the present application is a carrier member according to the first invention. In this carrier member, the connecting fiber connects a peripheral part of an opening of the front surface layer and a peripheral part of an opening of the back surface layer, for each opening. At least one part of at least one connecting fiber is located inside each virtual space. The virtual space is a space which is surrounded with both surface layers and virtual vertical walls. The virtual vertical walls are extended, from inner edges of the peripheral part of the opening of one layer, to that of the other layer.

According to the second invention of the present application, the first invention can be embodied.

A third invention of the present application is a carrier member according to the second invention. In this carrier member, the connecting fiber comes across the virtual space and connects a peripheral part of an opening of the front surface layer and the peripheral part of an opening of the back surface layer.

According to the third invention of the present application, the second invention can be realized.

A fourth invention of the present application is a carrier member according to the third invention. In this carrier member, the peripheral part of the opening consists of corner parts and line parts. The connecting fiber connects a corner part or line part of the opening of the front surface layer and the corner part or line part of the opening of the back surface layer. Parts connected by the connecting fiber are opposite across the virtual space.

According to the fourth invention of the present application, the third invention can be embodied.

As shown in FIG. 2A, the opening of the front surface layer has edges I, II, III, and IV, and the opening of the back surface layer has edges I', II', III', and IV'. A combination of I and III', a combination of II and IV', a combination of III and I', and a combination of IV and II' are edges which are "opposite across the virtual space".

As shown in FIG. 2B, when the opening is hexagonal, a combination of I and IV', a combination of II and V', and so on are edges which are "opposite across the virtual space".

A fifth invention of the present application is a carrier member according to the first or second invention. In this carrier member, the opening of the front surface layer and the opening of the back surface layer are overlapped in a plan view. More than 70% of an area of the opening of one layer is overlapped with an area of the opening of the other layer.

According to the fifth invention of the present application, much air volume which passes through the opening of the carrier member can be assured.

As shown in FIG. 1A, FIG. 1B, and FIG. 1C, there are opening A of the front surface layer and opening B of the back surface layer. When opening A and opening B are seen in a plan view from the front surface layer, and a relation between opening A and opening B is the following (1)-(3), it can be said that 100% of an area of opening A overlaps with that of opening B. This is shown in FIG. 1A.

(1) The shape and size of opening A are the same as that of opening B.
(2) Opening B is situated just under opening A.
(3) An attitude of opening A is the same as that of opening B.

When opening B is not situated just under opening A, although the shape and size of opening A are the same as that of opening B, a shaded part is overlapped as shown in FIG. 1B. And, it is desirable that an area of the shaded part possesses more than 70% of an area of one of openings A and B.

When the attitude of opening A is not the same as that of opening B, although the shape and size of opening A are the same as that of opening B and opening B is situated just under opening A, the shaded part is overlapped as shown in FIG. 1C. And, it is desirable that an area of the shaded part possesses more than 70% of an area of one of openings A and B.

As not shown in FIG. 1B or 1C, even if the shape or size of an opening of the front surface layer is not the same as that of an opening in the back surface layer, it is desirable that more than 70% of an area of the opening of one layer is overlapped with the opening of the other layer.

When a size of the opening of the front surface layer is different from that of the opening of the back surface layer, a large opening should be standard. That is, it is desirable that more than 70% of an area of the large opening is overlapped with a small opening.

When a side for receiving blown air and a side for exhausting the blown air are evident, the side for receiving the blown air may be standard.

A sixth invention of the present application is a carrier member according to the first or second invention. In this carrier member, at least one connecting fiber is curved.

According to the sixth invention of the present application, it is easy for the at least one connecting fiber to be included inside the virtual space.

A seventh invention of the present application is a carrier member according to the first or second invention. In this carrier member, a peripheral part of each opening is comprised of lines. Each line consists of a bundle of fibers. The line has a width of more than 0.6 mm. Each connecting fiber has a diameter of less than 0.2 mm.

According to the seventh invention of the present application, a preferred carrier member can be obtained.

An eighth invention of the present application is a carrier member according to the first invention. In this carrier member, at least two connecting fibers are seen inside an opening.

A ninth invention of the present application is a carrier member according to the second invention. In this carrier member, at least two connecting fibers are located inside the virtual space.

According to the eighth or ninth invention of the present application, an effect by the first invention can be surely obtained.

Conversely, all of the connecting fibers are not included inside the virtual space.

A tenth invention of the present application is a support member for volatilizing a volatile component. In the support member, the volatile component is held by the carrier member of any one of the first to ninth inventions.

The support member according to the tenth invention of the present application can release more efficiently the volatile component to exert more sufficiently efficacy of the volatile component from a beginning stage.

An eleventh invention of the present application is a support member according to the tenth invention. In this support member, the volatile component is an insect-pest-control component.

The support member according to the eleventh invention of the present application can show an insect-pest-control effect.

The present inventions can provide a carrier member which can release more efficiently a volatile component. For example, when the carrier member holding a volatile insect-pest-control component is used for a fan-type and non-heating-type apparatus, the apparatus can exert more sufficiently efficacy of the volatile component from a beginning stage.

DETAILED DESCRIPTION OF THE PREFERRED EMBODIMENTS

Some embodiments of carrier members of the present invention are described below. A carrier member is a member for holding a volatile component such as an insect-pest-control component. A support member is a carrier member which holds the volatile component.

First Embodiment

Construction and function of a carrier member of a first embodiment of the present invention are described below.

Figure 1A:
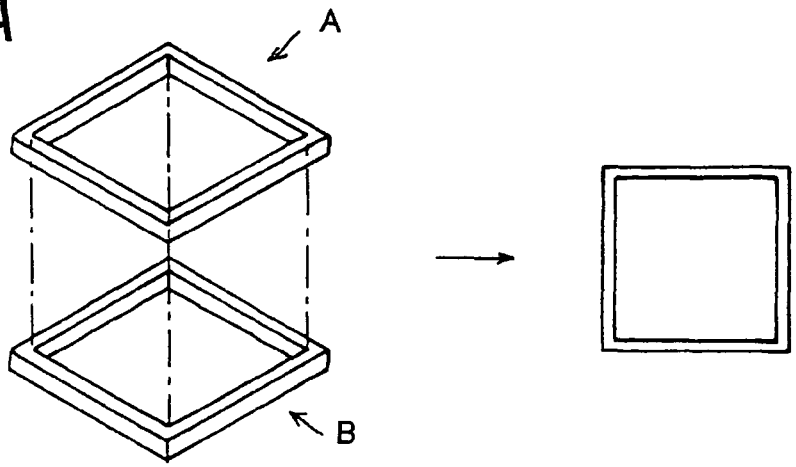
FIG. 1A, FIG. 1B, and FIG. 1C are explanatory views explaining a positional relationship between an opening of a front surface layer and an opening of a back surface layer, respectively.
Figure 1B:
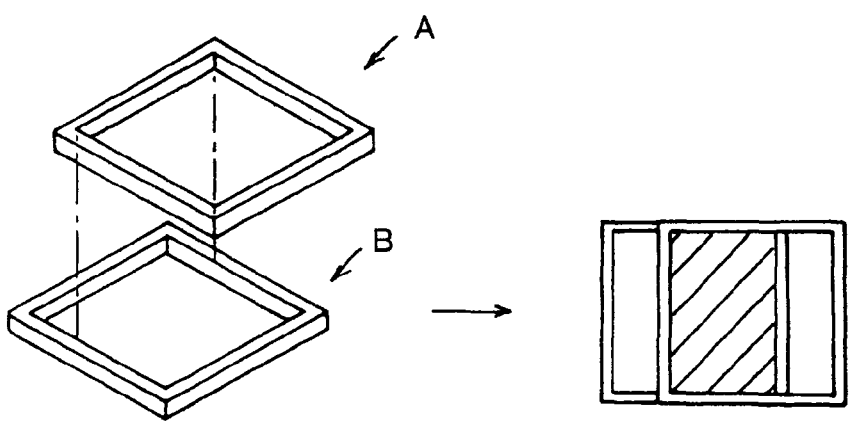
Figure 1C:
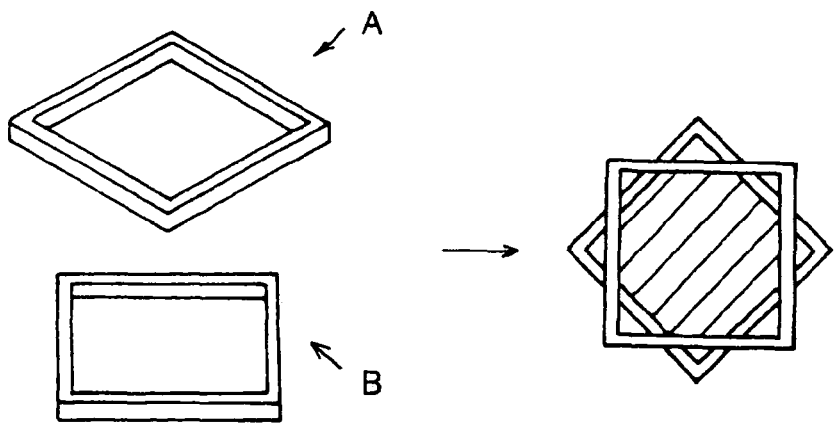
Figure 2A:
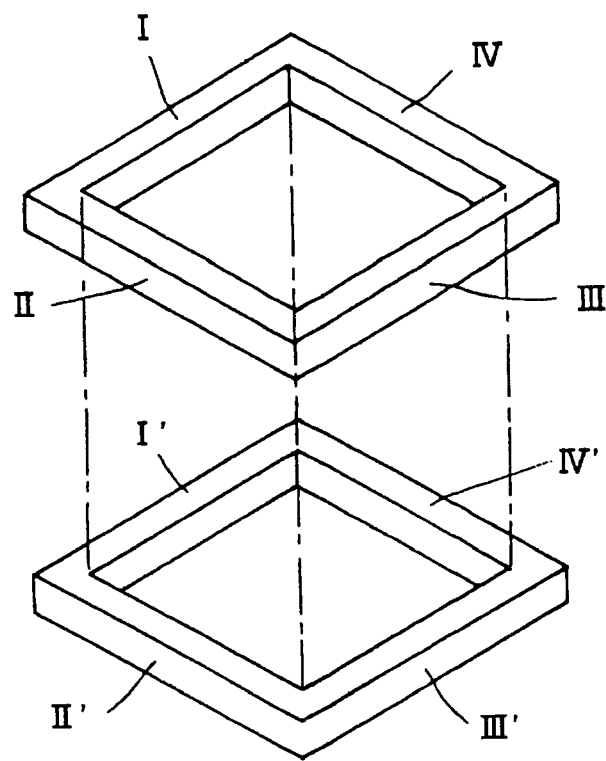
FIG. 2A and FIG. 2B are explanatory views explaining a positional relationship between an edge of the opening of the front surface layer and an edge of the opening of the back surface layer, respectively.
Figure 2B:
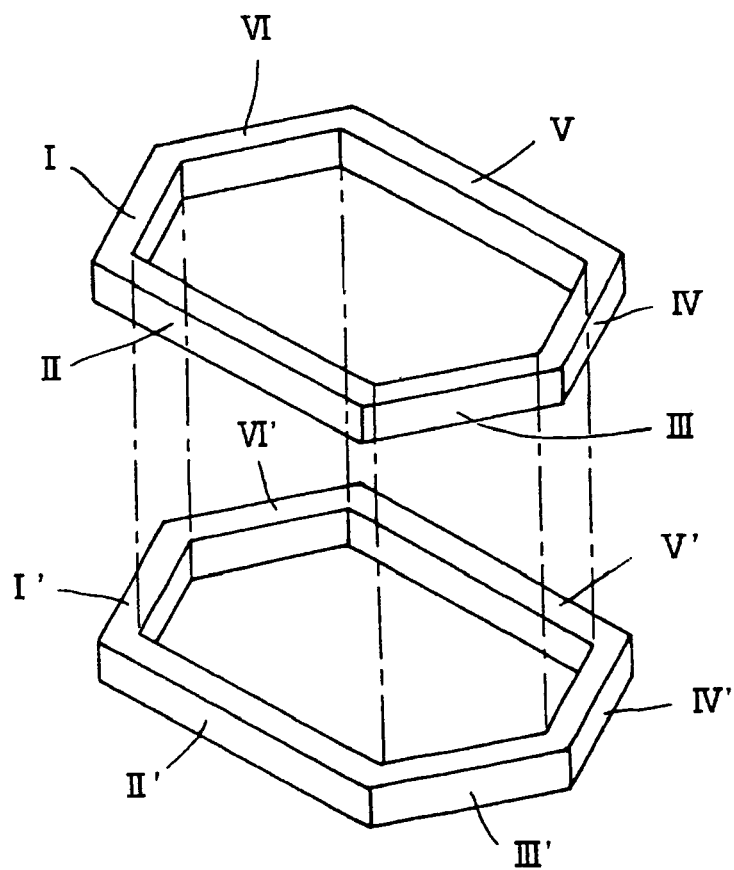
Figure 3:
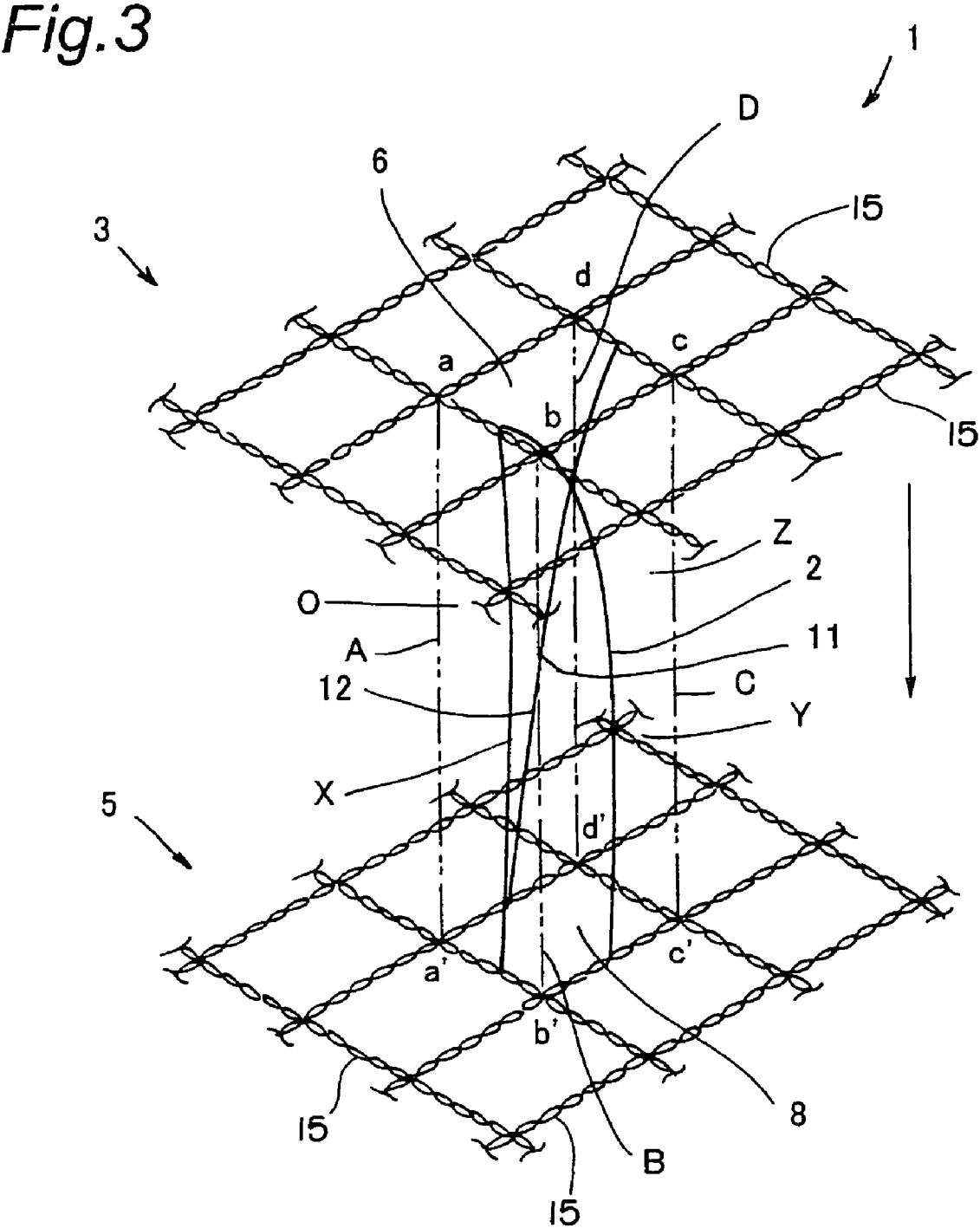
FIG. 3 is a perspective view explaining a fundamental construction of a carrier member according to a first embodiment.
Figure 4:
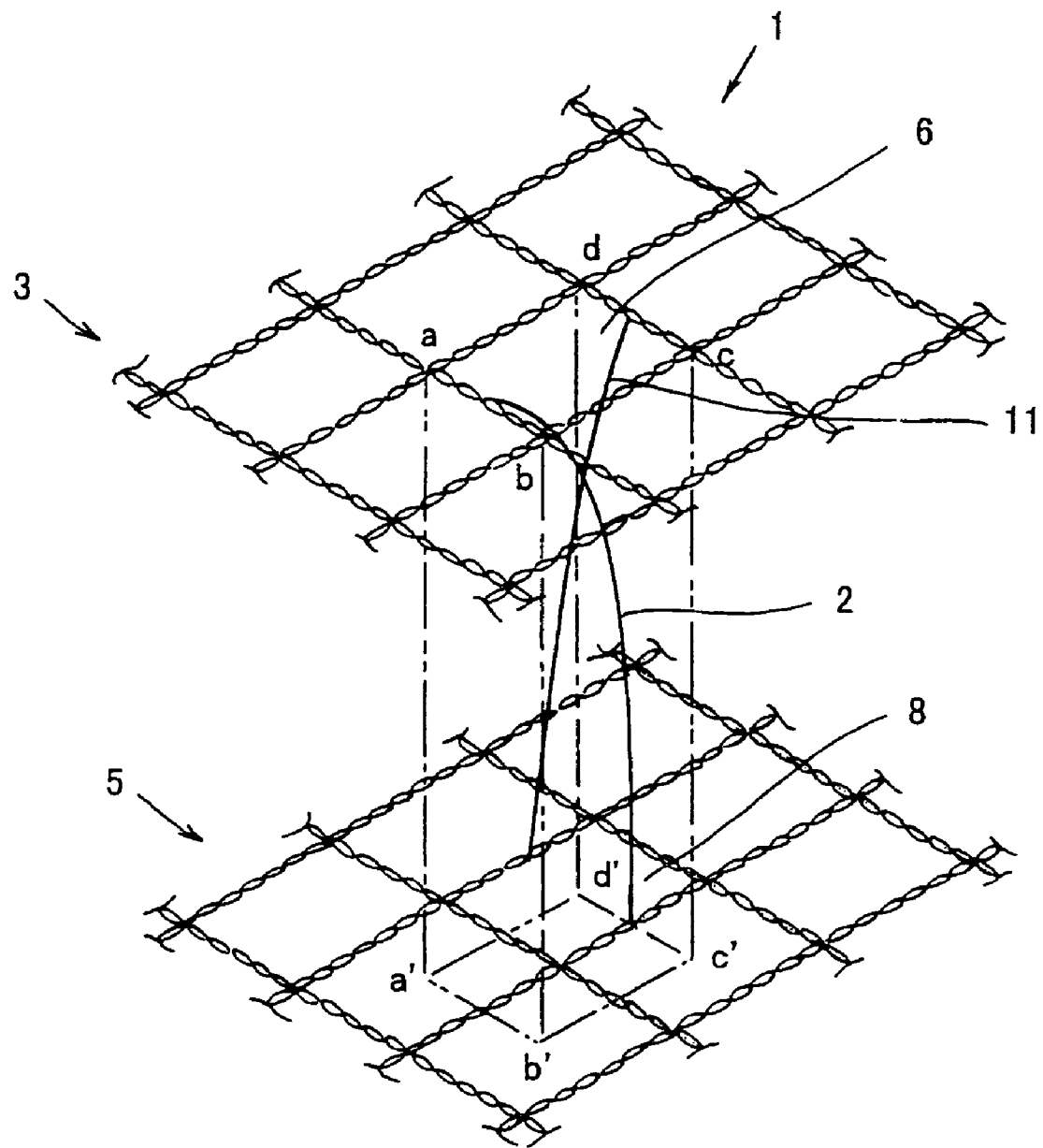
FIG. 4 is a perspective view showing a modification example of the carrier member shown in FIG. 3.
Figure 5:
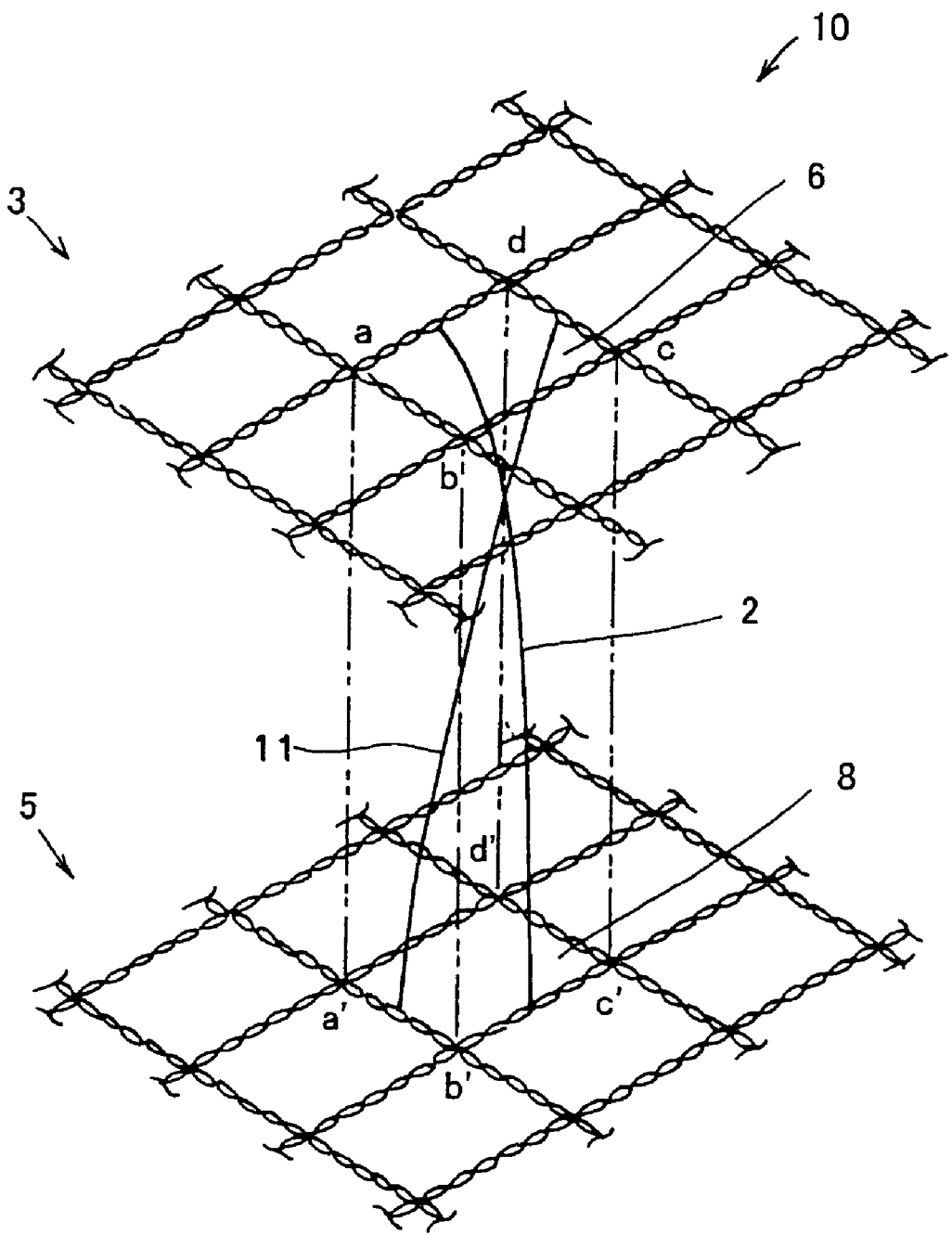
FIG. 5 is a perspective view showing a further modification example of the carrier member shown in FIG. 3.

FIG. 3 is a perspective view explaining a fundamental construction of the carrier member of the first embodiment. FIG. 4 and FIG. 5 are modification examples of the carrier member shown in FIG. 3, respectively.

As shown in FIG. 3, carrier member 1 of the first embodiment has a structure in which connecting fibers 2, are included inside a virtual space. Therefore, the carrier member 1 has a high opportunity for a volatile component to touch blown air, and has high volatilization efficiency.

That is, the carrier member 1 of the first embodiment has a three-dimensional structure which is constructed by a front surface layer 3 made of a fabric, a back surface layer 5 made of a fabric, and three connecting fibers 2, 11 and 12. The connecting fibers connect the layer 3 and the layer 5. The front surface layer 3 has a knitted fabric structure, and has openings 6 which are arranged regularly. The back surface layer 5 has a knitted fabric structure, and has openings 8 which are arranged regularly.

As shown in FIG. 3, each opening 6 is composed of lines 15. Each line 15 is a bundle of fibers. Although the line 15 has many meshes, each mesh is distinguished from the opening 6. That is, the opening 6 is surrounded with the line 15 having the meshes. A size of the opening 6 is usually more than 1 $mm^2$ and is preferably more than 4 $mm^2$. The opening 8 is the same as opening 6.

In the carrier member 1, a part of the connecting fiber 2 and a part of the connecting fiber 11 are included inside the virtual space surrounded with layer 3, layer 5 and virtual vertical walls. The virtual vertical walls are extended downwardly from inner edges of lines 15 of opening 6.

That is, in the first embodiment, the opening 6 of the front surface layer 3 is connected with the opening 8 of the back surface layer 5 by three connecting fibers 2, 11 and 12, and a part of the connecting fiber 2 and a part of the connecting fiber 11 are included inside the virtual space.

Referring to FIG. 3, in the carrier member 1 of the first embodiment, parts of two connecting fibers 2 and 11 of three connecting fibers 2, 11 and 12 are included in the three-dimensional virtual space which is surrounded with chain double-dashed lines A, B, C and D.

That is, a plane surrounded with chain double-dashed lines A and B is a virtual vertical wall X, a plane surrounded with chain double-dashed lines B and C is a virtual vertical wall Y, a plane surrounded with chain double-dashed lines C and D is a virtual vertical wall Z, a plane surrounded with chain double-dashed lines D and E is a virtual vertical wall O. In the carrier member 1 of the first embodiment, parts of the connecting fibers 2 and 11 are included in the three-dimensional virtual space which is surrounded with the vertical walls X, Y, Z and O.

More specifically, the opening 6 of the front surface layer 3 is a quadrangle surrounded with corner parts a, b, c and d as shown in FIG. 3. The back surface layer 5 facing the front surface layer 3 has also the opening 8 surrounded with corner parts a', b', c' and d'. The corner part a and the corner part a' are in corresponding positions. The corner part b and the corner part b' are in corresponding positions. The corner part c and the corner part c' are in corresponding positions. The corner part d and the corner part d' are in corresponding positions.

The connecting fiber 2 connects line part a-b of the front surface layer 3 and line part b'-c' of the back surface layer 5. The connecting fiber 2 has a curved portion. A part of the connecting fiber 2 is included in the virtual space surrounded with the vertical walls X, Y, Z and O.

Other connecting fiber 11 connects line part c-d of the front surface layer 3 and line part d'-a' of the back surface layer 5. A part of the connecting fiber 11 is also included in the virtual space surrounded with the vertical walls X, Y, Z and O.

In a plan view of the carrier member 1 of the first embodiment, parts of the connecting fibers 2 and 11 can be seen inside the quadrangular opening 6.

According to the carrier member 1 of the first embodiment, blown air enters interiorly of the carrier member 1 from the opening 6 and passes through the back surface layer 5, as indicated by an arrow mark. However, in the first embodiment, since parts of the connecting fibers 2 and 11 are included in the virtual space, which is surrounded with the vertical walls X, Y, Z and O and is blown air flow channel in the carrier member 1, the blown air touches the connecting fibers 2 and 11.

The connecting fibers 2 and 11 have respectively a curved portion. However, since the connecting fibers 2 and 11 connect the front surface layer 3 and the back surface layer 5, the connecting fibers 2 and 11 have respectively a part extending along a direction of flow of the blown air. Therefore, when the blown air passes through the carrier member 1, the blown air touches the connecting fibers 2 and 11 for a relatively long time and volatilizes the volatile component held by the connecting fibers 2 and 11.

In the first embodiment, since parts of the connecting fibers 2 and 11 are included in the virtual space, which is blown air flow channel in the carrier member 1, the connecting fibers 2 and 11 become obstacles for the blown air. Therefore, a slight turbulence occurs inside the carrier member 1 and promotes volatilization of the volatile component.

However, since the connecting fibers 2 and 11 extend along the direction of the flow of the blown air, resistances of the connecting fibers 2 and 11 to the blown air are small. Therefore, the carrier member 1 can assure much air volume which passes therethrough.

As mentioned above, the carrier member 1 has many opportunities for the volatile component to touch the blown air, and the carrier member 1 generates a small turbulence thereinside, and the carrier member 1 can assure much air volume which passes therethrough. Therefore, the carrier member 1 is superior in ability to volatilize the volatile component held by the carrier member 1.

In the carrier member 1 shown in FIG. 3, the opening 6 of the front surface layer 3 is in the same position as the opening 8 of the back surface layer 5. However, the opening 6 and the opening 8 may be not in the same positions as shown in FIG. 4. When the opening 6 and the opening 8 are not in the same positions, the carrier member 1 increases opportunities for the volatile component to touch the blown air. However, resistance to the blown air is increased and passed air volume is decreased. Therefore, it is desirable that more than 70% of an area of one of the openings 6 and 8 is overlapped with an area of the other of the openings 6 and 8.

As shown in FIG. 5, connecting fibers 2 and 11 may come across a virtual space surrounded with vertical walls X, Y, Z and O.

That is, in the carrier member 1 as shown in FIG. 5, the connecting fiber 2 connects line part d-a of front surface layer 3 and line part b'-c' of back surface layer 5. Since the line part d-a of the front surface layer 3 faces the line part b'-c' of the back surface layer 5 in a three-dimensionally oblique direction, the connecting fiber 2 comes across the virtual space surrounded with the vertical walls X, Y, Z and O.

The connecting fiber 11 connects a line part c-d of the front surface layer 3 with a line part a'-b' of the back surface layer 5. Since the line part c-d of the front surface layer 3 faces the line part a'-b' of the back surface layer 5 in a three-dimensionally oblique direction, the connecting fiber 2 comes across the virtual space surrounded with the vertical walls X, Y, Z, O.

The connecting fiber 2 connects an edge part of an opening of the front surface layer and an edge part of an opening of the back surface layer. The edge part being connected with the connecting fiber 2 in the front surface layer and the edge part being connected with the connecting fiber 2 in the back surface layer are in a position facing each other across the virtual space. Therefore, the connecting fiber 2 comes across the virtual space. The connecting fiber 11 is the same as that of the connecting fiber 2.

Second Embodiment

Figure 6A:
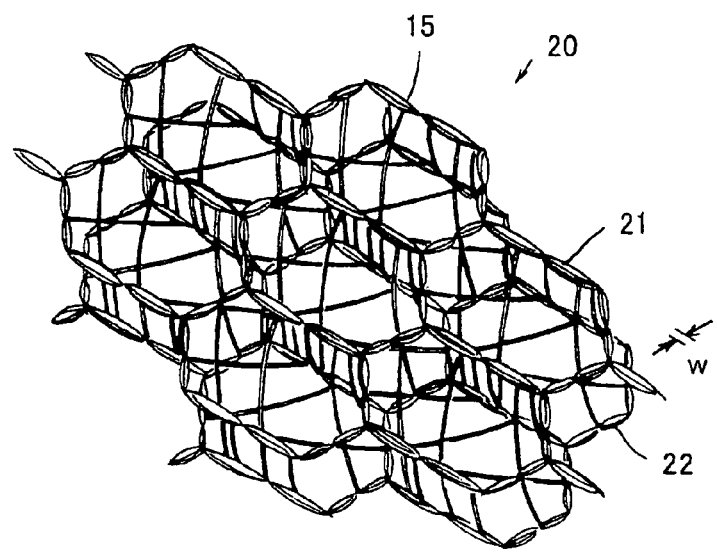
FIG. 6A is a perspective view showing a carrier member according to a second embodiment.
Figure 6B:
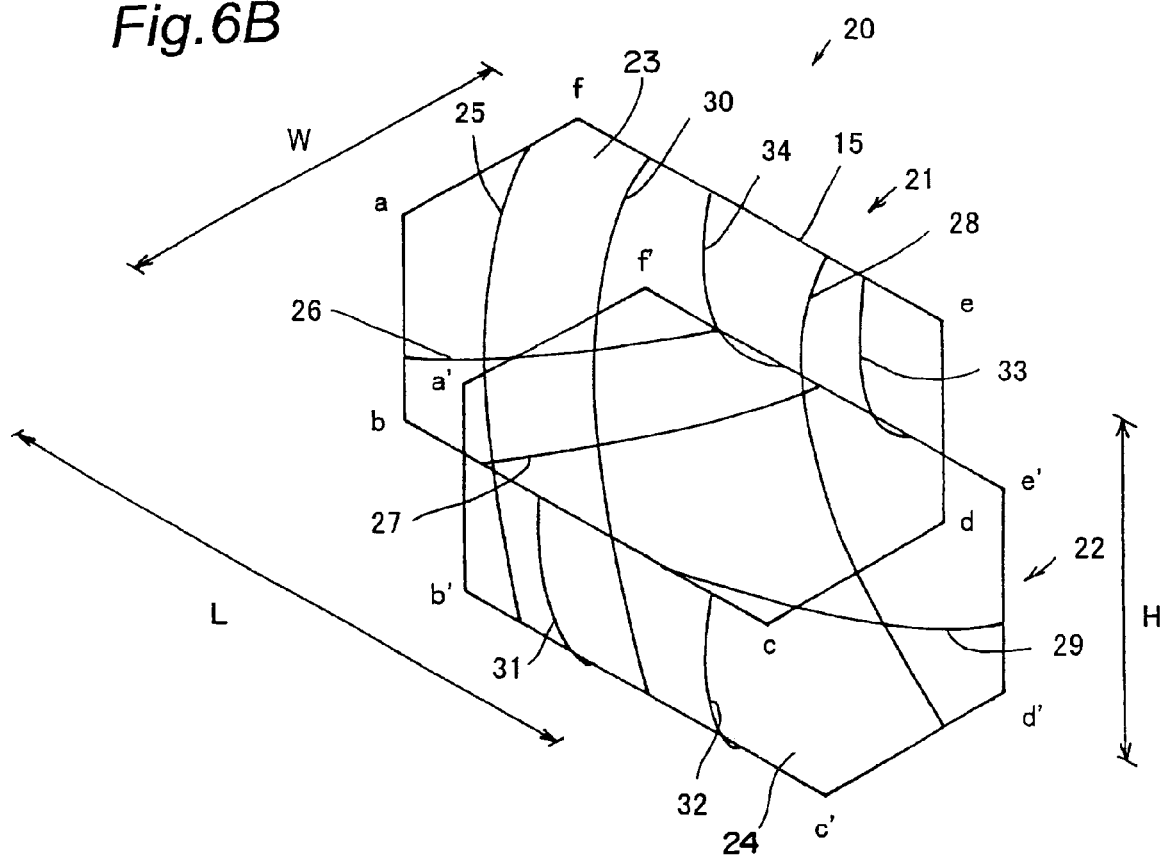
FIG. 6B is a explanatory view explaining a relationship between openings and connecting fibers.

FIG. 6A is a perspective view showing a carrier member according to a second embodiment. FIG. 6B is a explanatory view explaining a relationship between openings and connecting fibers.

As shown in FIG. 6A, openings of front surface layer 21 and back surface layer 22 are hexagonal, and are more specifically of a hexagonal pattern. More specifically, as shown in FIG. 6B, opening 23 of the front surface layer 21 is composed of corner parts a, b, c, d, e and f. An opening 24 of the back surface layer 22 is composed of corner parts a', b', c', d', e' and f'. In the opening 23, line part b-c and line part e-f facing line part b-c are long, and other line parts are short. A virtual space is composed of corner parts a, b, c, d, e, f, a', b', c', d', e' and f'. The virtual space is surrounded with the layer 21, the layer 22 and virtual vertical walls. The virtual vertical walls are extended downwardly from inner edges of lines 15 of the opening 23.

A width W (inner size) of the opening is 1.1 mm~6.3 mm, a length L of the opening is 1.3 mm~7.7 mm, and an entire height H of the opening is about 2.1 mm~11.9 mm. A width w of line 15 surrounding the opening is about 0.2 mm~1.4 mm.

There are connecting fibers which connect a short line part of one layer and a long line part of the other layer, and which come across the virtual space a, b, c, d, e, f, a', b', c', d', e' and f'.

Carrier member 20 of the second embodiment has connecting fibers 25, 26, 27, 28, 29, 30, 31, 32, 33 and 34.

The connecting fiber 26 connects short line part a-b of the front surface layer 21 and long line part e'-f' of the back surface layer 22. In the opening 23, the short line part a-b is not adjacent to long line part e-f. Meanwhile, the opening 23 and the opening 24 are overlapped in a plan view. That is, long line part e-f of the opening 23 and long line part e'-f' of the opening 24 are overlapped in a plan view. Therefore, short line part a-b of the opening 23 is not adjacent to long line part e'-f' of the opening 24 in a plan view. According to this construction, the connecting fiber 26 comes across the virtual space.

The connecting fiber 25 connects short line part f-a of the front surface layer 21 and long line part b'-c' of the back surface layer 22. Like the case of the connecting fiber 26, short line part f-a is not adjacent long line part b'-c' in a plan view. Therefore, the connecting fiber 25 comes across the virtual space.

The connecting fiber 28 connects long line part e-f of the front surface layer 21 and short line part c'-d' of the back surface layer 22. Like the case of the connecting fiber 26, short line part e-f is not adjacent long line part c'-d' in a plan view. Therefore, the connecting fiber 28 comes across the virtual space.

The connecting fiber 29 connects long line part b-c of the front surface layer 21 and short line part d'-e' of the back surface layer 22. Like the case of the connecting fiber 26, short line part b-c is not adjacent long line part d'-e' in a plan view. Therefore, the connecting fiber 29 comes across the virtual space.

There are connecting fibers which connect a long line part of one layer and a long line part of the other layer. The long line part of one layer and the long line part of the other layer are located in a three-dimensionally oblique direction.

The connecting fiber 27 connects long line part b-c of the front surface layer 21 and long line part e'-f' of the back surface layer 22. Long line part b-c faces long line part e'-f' in a three-dimensionally oblique direction. Therefore, the connecting fiber 27 comes across the virtual space.

The connecting fiber 30 connects long line part e-f of the front surface layer 21 and long line part b'-c' of the back surface layer 22. Long line part e-f faces long line part b'-c' in a three-dimensionally oblique direction. Therefore, the connecting fiber 30 comes across the virtual space.

The connecting fibers 31 and 32 connect respectively long line part b-c and long line part b'-c'. The connecting fibers 33 and 34 connect respectively long line part e-f and long line part e'-f'. The connecting fibers 33 and 34 curve to an inside in the virtual space. Therefore, parts of the connecting fibers 33 and 34 are included inside the virtual space.

Third Embodiment

Figure 7A:
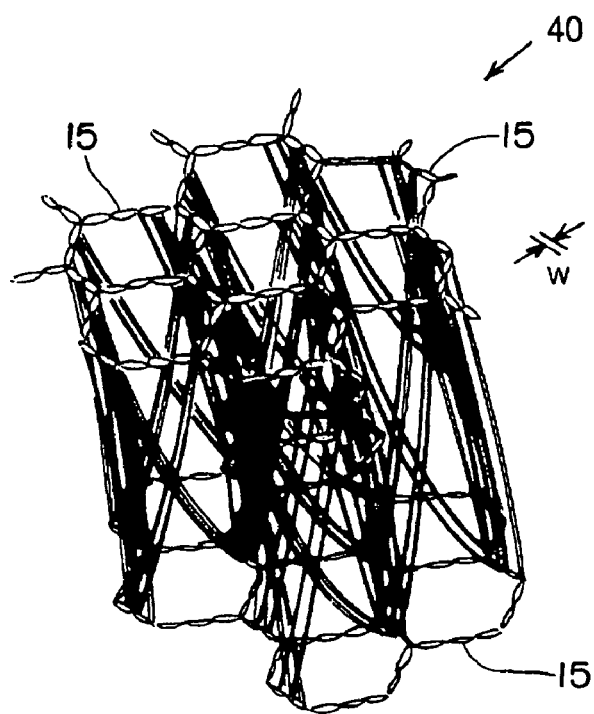
FIG. 7A is a perspective view showing a carrier member according to a third embodiment.
Figure 7B:
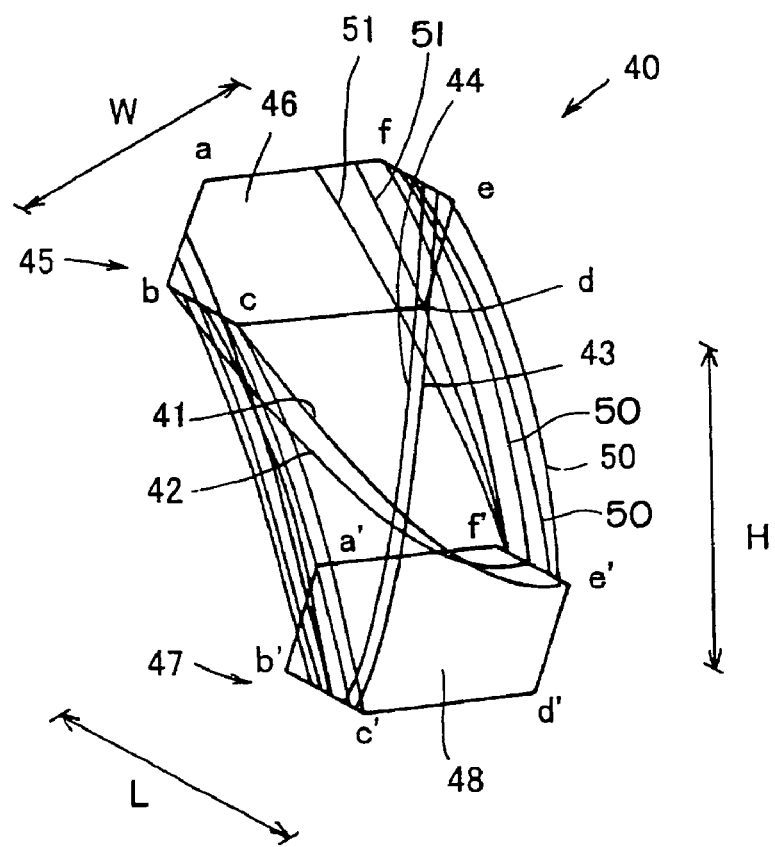
FIG. 7B is a explanatory view explaining a relationship between openings and connecting fibers.

FIG. 7A is a perspective view showing the carrier member according to a third embodiment. FIG. 7B is a explanatory view explaining a relationship between openings and connecting fibers. The carrier member of the third embodiment has connecting fibers which come across a virtual space.

Carrier member 40 is comprised of front surface layer 45, back surface layer 47, and connecting fibers. The front surface layer 45 has openings 46 and the back surface layer 47 has openings 48. Each opening 46 is a hexagonal pattern and is composed of six line parts. Each line part has almost the same length. Each opening 48 is the same as the opening 46.

A width W (inner size) of each opening is 1.1 mm-6.3 mm, a length L of the opening is 1.8 mm~10.2 mm, and an entire height H of the opening is about 1 mm~5 mm. A width w of line 15 surrounding each opening is about 0.3 mm~1.7 mm.

The opening 46 is composed of corner parts a, b, c, d, e and f. The opening 48 is composed of corner parts a', b', c', d', e' and f'. The virtual space is composed of corner parts a, b, c, d, e, f, a', b', c', d', e' and f'. The carrier member 40 has connecting fibers 41, 42, 43, 44, 50 and 51. The virtual space is surrounded with the layer 45, the layer 47 and virtual vertical walls. The virtual vertical walls are extended downwardly from inner edges of the lines 15 of the opening 46.

The connecting fiber 41 connects line part b-c of the opening 46 and line part e'-f' of the opening 48. Line part b-c and line part e'-f' are opposite across the virtual space. Therefore, the connecting fiber 41 comes across the virtual space. That is, the connecting fiber 41 is included inside the virtual space. The connecting fiber 42 connects like the connecting fiber 41. However, the connecting fiber 42 intersects the connecting fiber 41.

The connecting fibers 43 and 44 connect line part e-f of the opening 46 and line part b'-c' of the opening 48. Line part e-f and line part b'-c' are opposite across the virtual space. Therefore, the connecting fibers 43 and 44 come across the virtual space. That is, the connecting fibers 43 and 44 are included inside the virtual space.

The connecting fibers 50 connect line part e-f of the opening 46 and line part e'-f' of the opening 48. Line part e-f faces line part e'-f'. The connecting fibers 51 connect line part f-a of the opening 46 and the corner part f' of the opening 48.

Fourth Embodiment

Figure 8A:
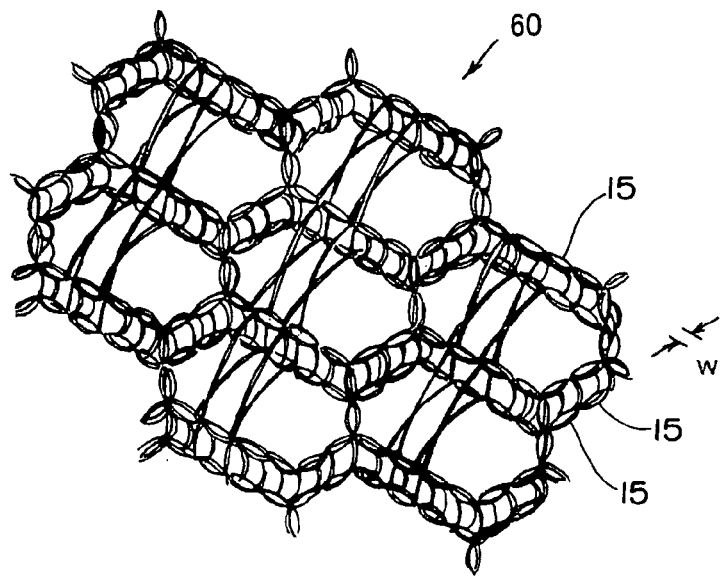
FIG. 8A is a perspective view showing a carrier member according to a fourth embodiment.
Figure 8B:
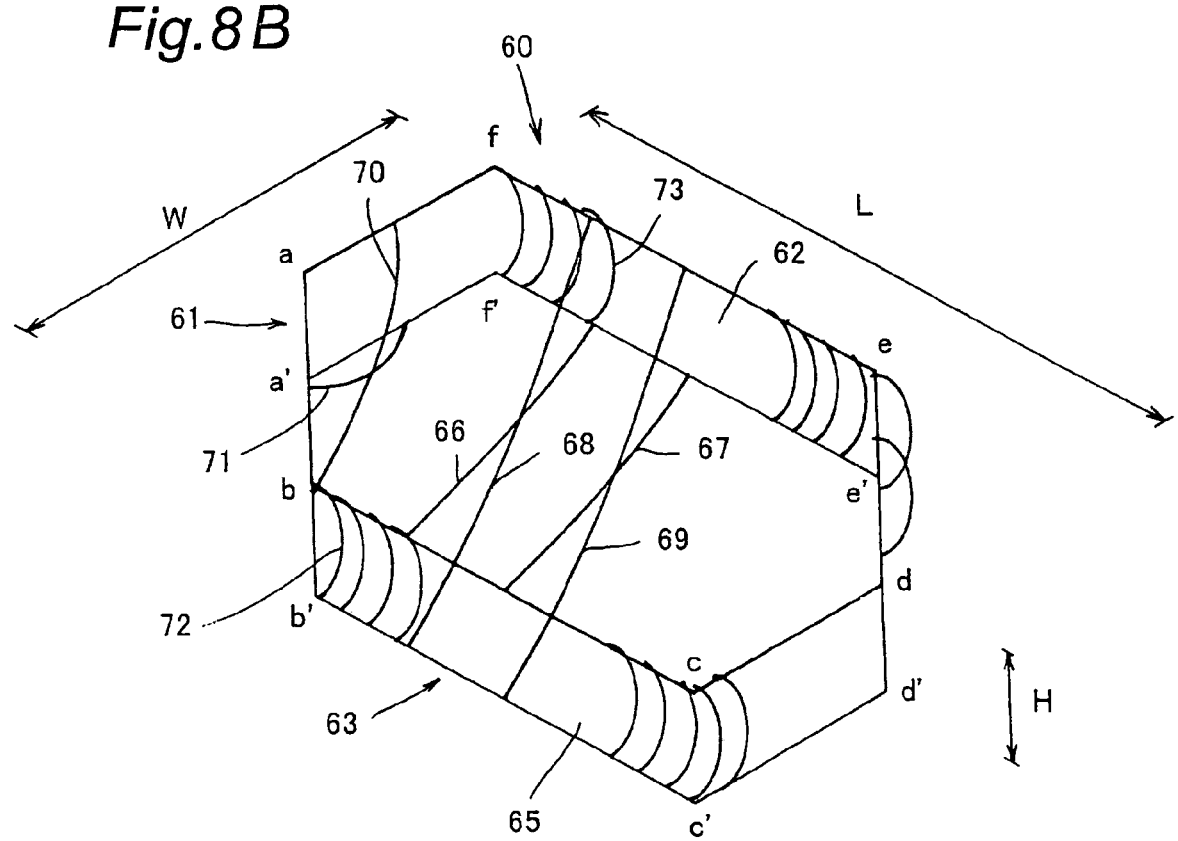
FIG. 8B is a explanatory view explaining a relationship between openings and connecting fibers.

FIG. 8A is a perspective view showing a carrier member according to a fourth embodiment. FIG. 8B is a explanatory view explaining a relationship between openings and connecting fibers. Carrier member 60 of the fourth embodiment has connecting fibers which come across a virtual space.

The carrier member 60 is comprised of front surface layer 61, back surface layer 63, and connecting fibers. The front surface layer 61 has openings 62 and the back surface layer 63 has openings 65. Each opening 62 is composed of corner parts a, b, c, d, e and f, and is a hexagonal pattern. The opening 62 has six line parts a-b, b-c, c-d, d-e, e-f and f-a. The line parts b-c and e-f are long, and the other line parts are short. Each opening 65 is composed of corner parts a', b', c', d', e' and f', and is the same as the opening 62. The virtual space is composed of corner parts a, b, c, d, e, f, a', b', c', d', e' and f'. The virtual space is surrounded with the layer 61, the layer 63 and virtual vertical walls. The virtual vertical walls are extended downwardly from inner edges of lines 15 of the opening 62.

A width W (inner size) of each opening is 0.9 mm-5.1 mm, a length L of the opening is 1.8 mm~10.2 mm, and an entire height H of the opening is about 0.9 mm~5.1 mm. A width w of the line 15 surrounding each opening is about 0.2 mm~1.2 mm.

The carrier member 60 has connecting fibers 66, 67, 68, 69, 70, 71, 72 and 73. The connecting fibers 66 and 67 connect line part b-c of the opening 62 and line part e'-f' of the opening 65. Line part b-c and line part e'-f' are opposite across the virtual space. Therefore, the connecting fibers 66 and 67 come across the virtual space. That is, the connecting fibers 66 and 67 are included inside the virtual space.

The connecting fibers 68 and 69 connect line part e-f of the opening 62 and line part b'-c' of the opening 65. Line part e-f and line part b'-c' are opposite across the virtual space. Therefore, the connecting fibers 68 and 69 come across the virtual space. That is, the connecting fibers 68 and 69 are included inside the virtual space.

The connecting fiber 70 connects short line part f-a of the opening 62 and short line part a'-b' of the opening 65. Short line part f-a is adjacent long line part a'-b' in a plan view. Therefore, the connecting fiber 70 is included inside the virtual space.

The connecting fiber 71 connects short line part a-b of the opening 62 and short line part f'-a' of the opening 65. Short line part a-b is adjacent long line part f'-a' in a plan view. Therefore, the connecting fiber 71 is included inside the virtual space.

The connecting fibers 72 connect long line part b-c of the opening 62 and long line part b'-c' of the opening 65. The connecting fibers 72 are convexly curved to the inside in the virtual space. Therefore, the connecting fibers 72 are included inside the virtual space.

The connecting fibers 73 connect long line part e-f of the opening 62 and long line part e'-f' of the opening 65. The connecting fibers 73 are convexly curved to the inside in an adjacent virtual space. Therefore, the connecting fibers 73 are included inside the adjacent virtual space.

Fifth Embodiment

Figure 9A:
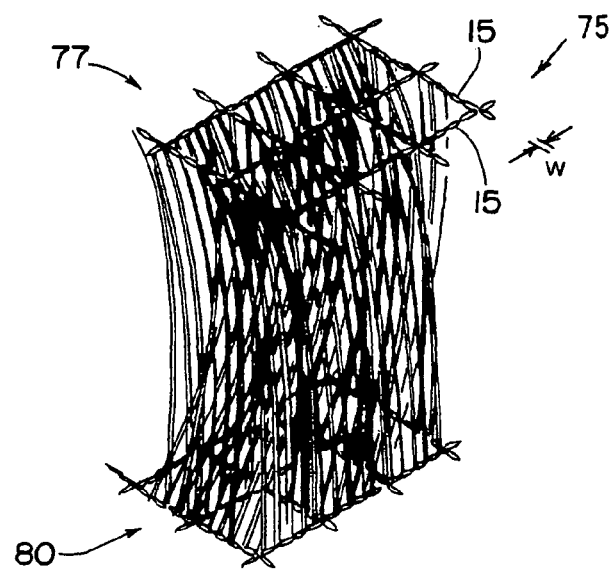
FIG. 9A is a perspective view showing a carrier member according to a fifth embodiment.
Figure 9B:
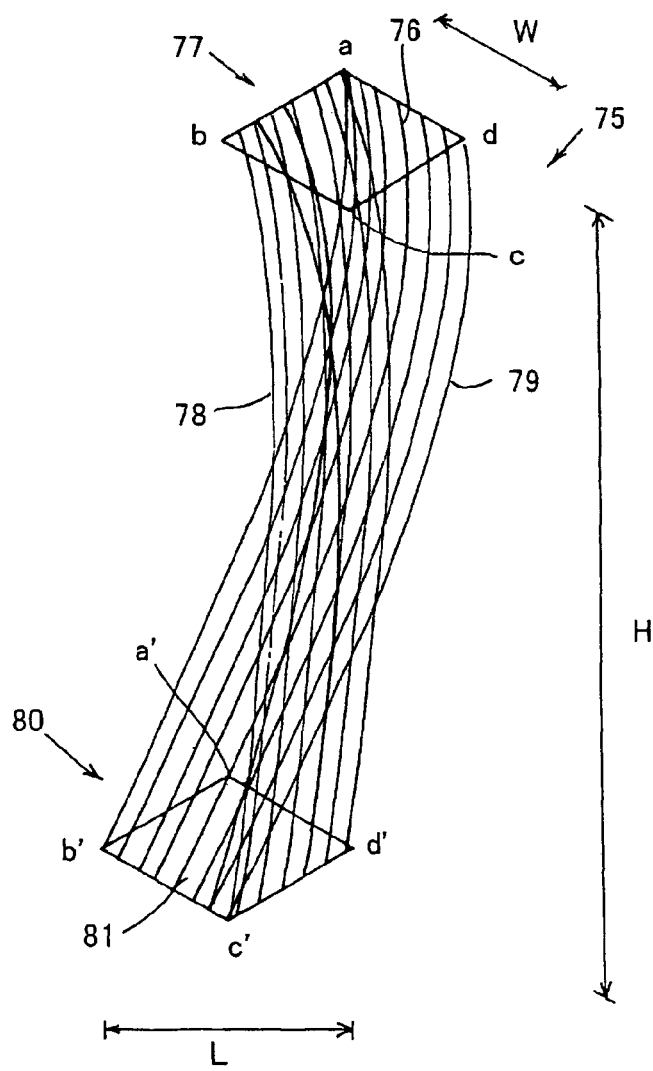
FIG. 9B is a explanatory view explaining a relationship between openings and connecting fibers.

FIG. 9A is a perspective view showing a carrier member according to a fifth embodiment. FIG. 9B is a explanatory view explaining a relationship between openings and connecting fibers. Carrier member 75 of the fifth embodiment has connecting fibers which come across a virtual space.

The carrier member 75 is comprised of a front surface layer 77, a back surface layer 80, and connecting fibers. The front surface layer 77 has openings 76 and the back surface layer 80 has openings 81. Each opening 76 is composed of corner parts a, b, c and d, and is approximately rhombic. The opening 76 has four line parts a-b, b-c, c-d and d-e. Each opening 81 is composed of corner parts a', b', c' and d, and is the same as the opening 76. The virtual space is composed of corner parts a, b, c, d, a', b', c' and d'. The virtual space is surrounded with the layer 77, the layer 80 and virtual vertical walls. The virtual vertical walls are extended downwardly from inner edges of lines 15 of the opening 76.

A width W (inner size) of each opening is 0.6 mm~3.4 mm, a length L of the opening is 0.7 mm~4.3 mm, and an entire height H of the opening is about 2.2 mm~12.8 mm. A width w of the line 15 surrounding the opening is about 0.2 mm~1.2 mm.

The carrier member 75 has connecting fibers 78 and 79. The connecting fibers 78 connect line part a-b of the opening 76 and line part c'-d' of the opening 81. Line part a-b and line part c'-d' are opposite across the virtual space. Therefore, the connecting fibers 78 come across the virtual space. That is, the connecting fibers 78 are included inside the virtual space.

The connecting fibers 79 connect line part d-a of the opening 76 and line part b'-c' of the opening 81. Line part d-a and line part b'-c' are opposite across the virtual space. Therefore, the connecting fibers 79 come across the virtual space. That is, the connecting fibers 79 are included inside the virtual space.

Sixth Embodiment

Figure 10A:
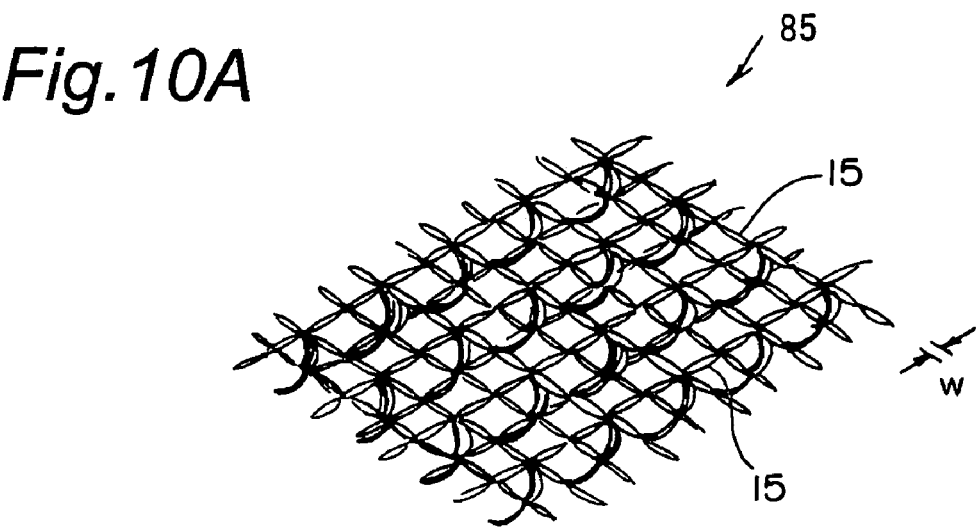
FIG. 10A is a perspective view showing a carrier member according to a sixth embodiment.
Figure 10B:
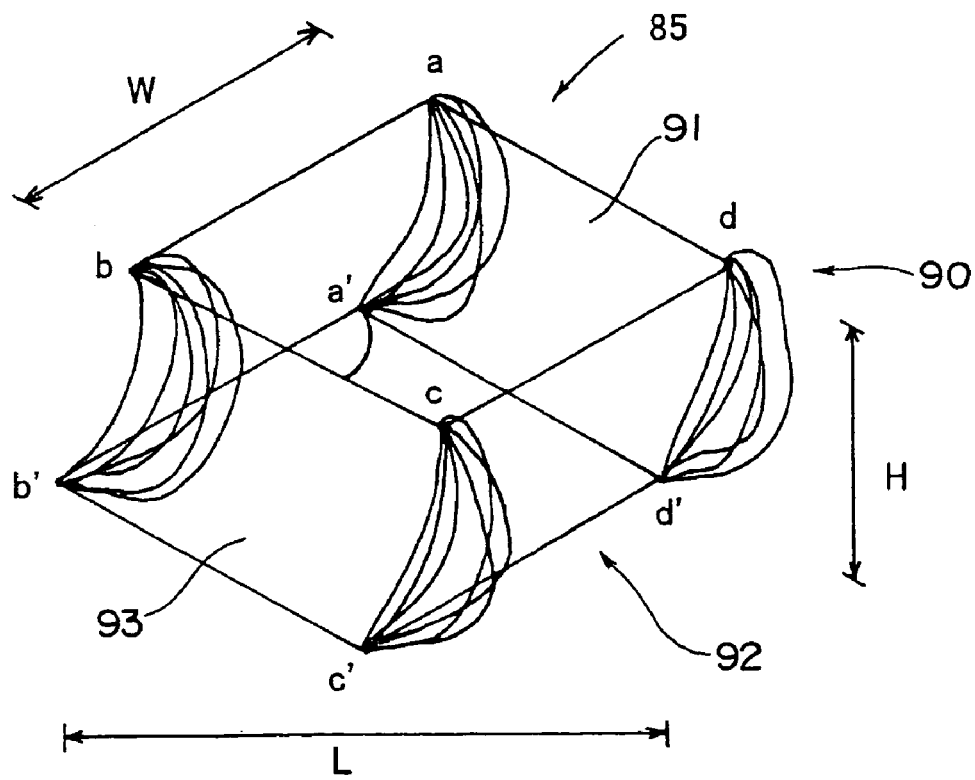
FIG. 10B is a explanatory view explaining a relationship between openings and connecting fibers.

FIG. 10A is a perspective view showing a carrier member according to a sixth embodiment. FIG. 10B is a explanatory view explaining a relationship between openings and connecting fibers. Carrier member 85 of the sixth embodiment has connecting fibers which come across a virtual space.

The carrier member 85 is comprised of a front surface layer 90, a back surface layer 92, and connecting fibers. The front surface layer 90 has openings 91 and the back surface layer 92 has openings 93. Each opening 91 is composed of corner parts a, b, c and d, and is approximately rhombic. Each opening 93 is composed of corner parts a', b', c' and d, and is the same as the opening 91. The virtual space is composed of corner parts a, b, c, d, a', b', c' and d'. The virtual space is surrounded with the layer 90, the layer 92 and virtual vertical walls. The virtual vertical walls are extended downwardly from inner edges of lines 15 of the opening 91.

A width W (inner size) of each opening is 0.5 mm~3.1 mm, a length L of the opening is 0.8 mm~4.6 mm, and an entire height H of the opening is about 0.4 mm~2.2 mm. A width w of line 15 surrounding the opening is about 0.2 mm~1.2 mm.

The carrier member 85 has many of the connecting fibers. The connecting fibers connect a corner part of the opening 91 and a corner part of the opening 93. These connected corner parts are in corresponding positions.

These connecting fibers curve roughly. Therefore, parts of these connecting fibers are included inside the virtual space.

It is preferred that a fiber made of a monofilament is used as a connecting fiber from a viewpoint of enhancing strength of the carrier member. The connecting fibers may be formed into a loop-like stitch in two knitted fabric layers. The connecting fibers may be hooked to the stitch of two knitted fabric layers with tuck structure.

It is preferred that, in order that the carrier member has appropriate elasticity or appropriate repulsion, a width of the connecting fiber is 15 denier~2000 denier, preferably 50 denier~300 denier, in a single fiber denier.

In order to assure air permeability of the opening, a diameter of the connecting fiber is preferably less than 0.2 mm.

In order to assure holding performance for a volatile component, a width of the line of the opening is preferably more than 0.6 mm.

The carrier member is usually a knitted fabric having a double needle bed. The knitted fabric is a longitude knitted fabric or a latitude knitted fabric. For example, the carrier member can be prepared by a double-raschel machine or a double-circular-knitting machine. The carrier members according to the above embodiments can be made of the following fiber. For example, synthetic fibers such as polyamide (for example, 6,6-polyamide, 6-polyamide and the like), polyester (for example, polyethylene terephthalate, polytrimethylene terephthalate, polybutylene terephthalate and the like), polyacrylonitrile and the like; semi-synthetic fibers such as acetate, triacetate and the like; regenerated fibers such as rayon, copra and the like; natural fibers such as wool, cotton and the like, may be used. Polyamide, or a blended product of polyamido and polyester, is more preferable because it is superior in terms of chemical resistance and rigidity of structural formation.

A thickness of the carrier member, that is, a distance between two knitted fabric layers, is usually 0.4 mm~35 mm, and is preferably 2 mm~10 mm. A unit weight of the carrier member is usually 50 g/m²~2.5 kg/m², and is preferably 200 g/m²~1000 g/m².

For example, FUSION (Trademark; Distributor: ASAHI KASEI FIBERS CORPORATION) can be used as this carrier member. In the present invention, these three-dimensional knitted fabrics which are commercially available can be used as the carrier member without change.

The carrier member is provided for use after cutting it into a desired size. Alternatively, the carrier member is provided for use after cutting it and then sewing or thermoforming it into a predetermined form.

The support member according to the present invention can be obtained by making the carrier member hold a volatile component. Following methods can be used for making the carrier member hold the volatile component. One method has a step of impregnating the carrier member with the volatile component or a volatile solution and then drying the carrier member if necessary. The volatile solution is comprised of a suitable solvent in which the volatile component is dissolved. Another method has a step of applying the volatile component or the volatile solution to the carrier member and then drying the carrier member if necessary.

Compounds which can volatilize at an ordinary temperature (for example, a vapor pressure at 25° C. is at least 1×10⁻⁶ mmHg) and have physiological activity (for example, perfume activity, insect-pest-control activity) can be used as the volatile component to be held by the carrier member. When the carrier member is used for an insect-pest-control apparatus of a non-heating-type, especially an apparatus of a fan-type, an effect of the carrier member is remarkable. It is preferred to use a volatile insect-pest-control component as the volatile component. It is preferred to use an insect-pest-control active compound which can volatilize at an ordinary temperature (for example, a vapor pressure at 25° C. is at least $1 \times 10^{-6}$ mmHg), as a volatile insect-pest-control component which is used in the present invention.

Following compounds can be used as the above-mentioned insect-pest-control active compound.

5-propargyl-2-furfuryl 2,2,3,3-tetramethylcyclopropanecarboxylate, 1-ethynyl-2-methyl-2-pentenyl 3-(2-methyl-1-propenyl)-2,2-dimethylcyclopropanecarboxylate, 1-ethynyl-2-methyl-2-pentenyl 3-(2-chloro-2-fluorovinyl)-2,2-dimethylcyclopropane-1-carboxylate, 2,3,5,6-tetrafluoro-4-methylbenzyl 3-(2-methyl-1-propenyl)-2,2-dimethylcyclopropanecarboxylate, 2,3,5,6-tetrafluoro-4-methylbenzyl 3-(2-chloro-2-flurucyclopropanecarboxylate, 2,3,5,6-tetrafluorobenzyl 3-(2,2-dichlorovinyl)-2,2-dimethylcyclopropanecarboxylate, 2,3,5,6-tetrafluoro-4-methyl benzyl 3-(1-propenyl)-2,2-dimethylcyclopropanecarboxylate, 2,3,5,6-tetrafluoro-4-methylbenzyl 3-(2,2-dichlorovinyl)-2,2-dimethylcyclopropanecarboxylate, 2,3,5,6-tetrafluoro-4-methoxymethylbenzyl 3-(2-methyl-1-propenyl)-2,2-dimethylcyclopropanecarboxylate, 2,3,5,6-tetrafluoro-4-methoxymethylbenzyl 3-(1-propenyl)-2,2-dimethylcyclopropanecarboxylate, 2-methyl-3-allyl-4-oxo-2-cyclopenten-1-yl 2,2,3,3-tetramethylcyclopropanecarboxylate, natural pyrethrin.

In the present invention, only one kind of the above-mentioned compounds may be used, or two or more kinds of the above-mentioned compounds may be used by mixing them.

From viewpoints of insect-pest-control activity and volatile property, at least one kind of compound is preferably selected from the group consisting of the following compounds.

2,3,5,6-tetrafluoro-4-methoxymethylbenzyl 3-(1-propenyl)-2,2-dimethylcyclopropanecarboxylate, 2,3,5,6-tetrafluoro-4-methylbenzyl 3-(1-propenyl)-2,2-dimethylcyclopropanecarboxylate, 2,3,5,6-tetrafluorobenzyl 3-(2,2-dichlorovinyl)-2,2-dimethylcyclopropanecarboxylate.

Moreover, at least one kind of compound is preferably selected from the group consisting of the following compounds.

2,3,5,6-tetrafluoro-4-methoxymethylbenzyl (1R)-trans-3-(1-propenyl(Z/E=8/1))-2,2-dimethylcyclopropanecarboxylate, 2,3,5,6-tetrafluoro-4-methylbenzyl (1R)-trans-3-(1-propenyl (Z/E=8/1))-2,2-dimethylcyclopropanecarboxylate.

An amount of the volatile component held in the carrier member can be changed according to application, status of use, duration of use, and the like. Generally, a range of the above-mentioned amount is 0.001 g~10 g, preferably 0.01 g~5 g, and more preferably 0.05 g~1 g, per 0.5 g of the carrier member.

The following compounds or components other than an insect-pest-control active compound can be used as the volatile component. For example, a perfume-antibacterial-insect-pest-repellent component which is contained in vegetable essential oil, and the like may be used. A synthetic insect-pest-repellent active compound such as Deet (Trade Name of diethyltoluamide), and the like may be used. In the present invention, a plurality of volatile components can be used at the same time.

If an antioxidant, such as BHT, or an ultraviolet absorbent, is added to the volatile component, stability of the support member to light, heat, or oxidation can be increased.

The support member according to the present invention can be used in a fan-type volatilizing apparatus and can exert an effect of desired insect-pest-control. In that case, the support member is reinforced with a suitable reinforcing material if necessary and is equipped in a place where airflow will occur on an upwind or downwind side of the fan. And then, the fan is rotated. In the above-mentioned fan-type volatilizing apparatus, a speed of airflow passing through the support member is usually 0.1 m/s~10 m/s.

The present invention will be described below in further detail by use of examples. The present invention should not be limited to these examples.

Example 1

First, a three-dimensional knitted fabric which has knitted structure shown in FIG. 6A and FIG. 6B was used as the carrier member. The front surface layer and the back surface layer of the carrier member had the openings. Each opening had width W of 3.7 mm, length L of 4.5 mm, and entire height H of 7 mm. The width of the line surrounding the opening was 0.8 mm. 100% of the line was made from polyester.

Next, the three-dimensional knitted fabric was cut into a circular form having a diameter of 5 cm.

Next, 2,3,5,6-tetrafluoro-4-methoxymethylbenzyl (1R)-trans-3-(1-propenyl(Z/E=8/1))-2,2-dimethylcyclopropan-ecarboxylate was used as a drug to be held by the carrier member. 120 mg of the drug was measured and an acetone solution of the drug was prepared.

Next, the acetone solution was uniformly poured onto the carrier member from the front surface layer by using a Pasteur pipette, so that the front surface layer, the back surface layer and the connecting fibers fully got a wetting.

And then, acetone was air-dried to prepare the support member of the present invention.

Example 2

First, a three-dimensional knitted fabric which has knitted structure shown in FIG. 7A and FIG. 7B was used as the carrier member. The front surface layer and the back surface layer of the carrier member had the openings. Each opening had width W of 3.7 mm, length L of 6 mm, and entire height H of 4 mm. The width of the line surrounding the opening was 1 mm.

Next, the three-dimensional knitted fabric was cut into a circular form having a diameter of 5 cm.

Next, 2,3,5,6-tetrafluoro-4-methoxymethylbenzyl (1R)-trans-3-(1-propenyl(Z/E=8/1))-2,2-dimethylcyclopropan-ecarboxylate was used as a drug to be held by the carrier member. 120 mg of the drug was measured and an acetone solution of the drug was prepared.

Next, the acetone solution was uniformly poured onto the carrier member from the front surface layer by using a Pasteur pipette, so that the front surface layer, the back surface layer and the connecting fibers fully got a wetting.

And then, acetone was air-dried to prepare the support member of the present invention.

Example 3

First, a three-dimensional knitted fabric which has knitted structure shown in FIG. 8A and FIG. 8B was used as the carrier member. The front surface layer and the back surface layer of the carrier member had the openings. Each opening had width W of 3 mm, length L of 6 mm, and entire height H of 3 mm. The width of the line surrounding the opening was 0.8 mm. 82% of the line was made from nylon and 18% of the line was made from polyester.

Next, the three-dimensional knitted fabric was cut into a circular form having a diameter of 5 cm.

Next, 2,3,5,6-tetrafluoro-4-methoxymethylbenzyl (1R)-trans-3-(1-propenyl(Z/E=8/1))-2,2-dimethylcyclopropan-ecarboxylate was used as a drug to be held by the carrier member. 120 mg of the drug was measured and an acetone solution of the drug was prepared.

Next, the acetone solution was uniformly poured onto the carrier member from the front surface layer by using a Pasteur pipette, so that the front surface layer, the back surface layer and the connecting fibers fully got a wetting.

And then, acetone was air-dried to prepare the support member of the present invention.

Example 4

First, a three-dimensional knitted fabric which has knitted structure shown in FIG. 9A and FIG. 9B was used as the carrier member. The front surface layer and the back surface layer of the carrier member had the openings. Each opening had width W of 2 mm, length L of 2.5 mm, and entire height H of 7.5 mm. The width of the line surrounding the opening was 0.7 mm.

Next, the three-dimensional knitted fabric was cut into a circular form having a diameter of 5 cm.

Next, 2,3,5,6-tetrafluoro-4-methoxymethylbenzyl (1R)-trans-3-(1-propenyl(Z/E=8/1))-2,2-dimethylcyclopropan-ecarboxylate was used as a drug to be held by the carrier member. 120 mg of the drug was measured and an acetone solution of the drug was prepared.

Next, the acetone solution was uniformly poured onto the carrier member from the front surface layer by using a Pasteur pipette, so that the front surface layer, the back surface layer and the connecting fibers fully got a wetting.

And then, acetone was air-dried to prepare the support member of the present invention.

Example 5

First, a three-dimensional knitted fabric which has knitted structure shown in FIG. 10A and FIG. 10B was used as the carrier member. The front surface layer and the back surface layer of the carrier member had the openings. Each opening had width W of 1.8 mm, length L of 2.7 mm, and entire height H of 1.3 mm. The width of the line surrounding the opening was 0.7 mm. 76% of the line was made from nylon and 24% of the line was made from polyester.

Next, the three-dimensional knitted fabric was cut into a circular form having a diameter of 5 cm.

Next, 2,3,5,6-tetrafluoro-4-methoxymethylbenzyl (1R)-trans-3-(1-propenyl(Z/E=8/1))-2,2-dimethylcyclopropan-ecarboxylate was used as a drug to be held by the carrier member. 120 mg of the drug was measured and an acetone solution of the drug was prepared.

Next, the acetone solution was uniformly poured onto the carrier member from the front surface layer by using a Pasteur pipette, so that the front surface layer, the back surface layer and the connecting fibers fully got a wetting.

And then, acetone was air-dried to prepare the support member of the present invention.

Test Example

Figure 11:
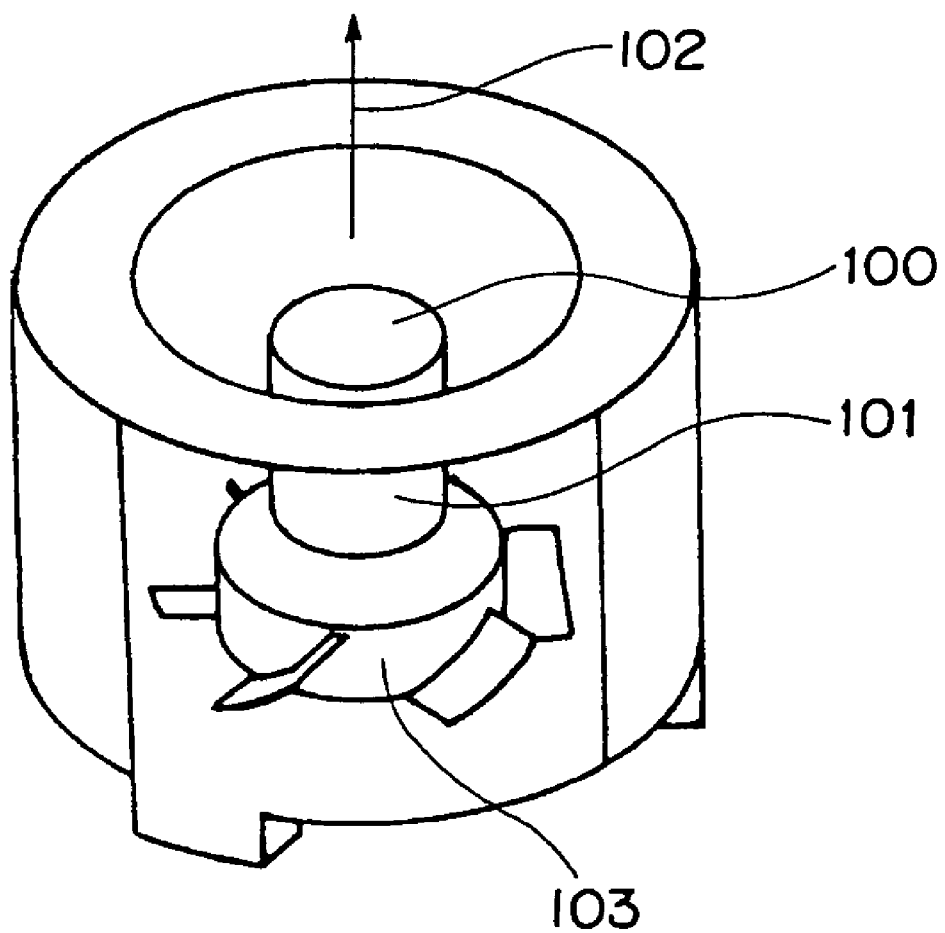
FIG. 11 is a perspective view showing a test apparatus.

Each support member 100 prepared in Examples 1~5 was used to prepare a test apparatus shown in FIG. 11. In the test apparatus, an electric fan 103 was placed below plastic cylinder 101. The support member 100 was placed on an upper part of the cylinder 101 so that airflow 102 from the fan 103 might hit perpendicularly to a planar surface of the support member 100. The cylinder 101 had a height of 7 cm and a diameter of 8.3 cm.

Insecticidal tests were performed as follows. First, five female adult insects of *Culex pipiens* pallens were released into a glass tube and both ends of the glass tube were closed by nylon nets. The glass tube had a diameter of 4 cm and a height of 12 cm. Second, the glass tube was set in the plastic cylinder and then a metal cylinder was placed under the plastic cylinder. The plastic cylinder had a diameter of 18 cm and a height of 30 cm. The metal cylinder had a diameter of 20 cm and a height of 80 cm. Third, the above-mentioned test apparatus was placed at a bottom of the metal cylinder and then the electric fan was activated so that a speed of airflow passing through the support member might be 1.0 m/s. Finally, after one minute from activating the electric fan, a number of knock-downed insects of *Culex pipiens* pallens was counted. And then, a knock-downed rate was calculated. As a result, a one minute after knockdown percentage was 100%.

INDUSTRIAL APPLICABILITY

The carrier member and the support member according to the present invention are very useful for a non-heating-type insect-pest-control apparatus, especially a fan-type apparatus.

What is claimed is:

1. A support member for volatilizing a volatile component, comprising:
    a carrier member comprising:
    a front surface layer made of a knitted fabric and having regularly arranged openings;
    a back surface layer made of a knitted fabric and having regularly arranged openings; and
    fibers interconnecting said front and back surface layers,
    wherein, for each of said regularly arranged openings of said front surface layer, at least two of said fibers are positioned so as to be seen within said each of said regularly arranged openings of said front surface layer in a plan view of said front surface layer, and
    wherein, for each of said regularly arranged openings of said back surface layer, at least two of said fibers are positioned so as to be seen within said each of said regularly arranged openings of said back surface layer in a plan view of said back surface layer; and
    a volatile component held by said carrier member, wherein said volatile component comprises an insect-pest-control component selected from the group consisting of 2,3,5,6-tetrafluoro-4-methoxymethylbenzyl 3-(1-propenyl)-2,2-dimethylcyclopropanecarboxylate, 2,3,5,6-tetrafluoro-4-methylbenzyl 3-(1-propenyl)-2,2-dimethylcyclopropanecarboxylate, and 2,3,5,6-tetrafluorobenzyl 3-(2,2-dichlorovinyl)-2,2-dimethylcyclopropanecarboxylate,
    for each of said regularly arranged openings of said front surface layer and a corresponding said each of said regularly arranged openings of said back surface layer, said at least two of said fibers interconnect a peripheral part of said each of said regularly arranged openings of said front surface layer and a peripheral part of said corresponding said each of said regularly arranged openings of said back surface layer, and
    said at least two of said fibers are positioned so as to be seen within said each of said regularly arranged openings of said front surface layer in a plan view of said front surface layer, and within said corresponding said each of said regularly arranged openings of said back surface layer, by virtue of being positioned within a virtual space defined by said front surface layer, said back surface layer, and virtual walls interconnecting said front and back surface layers and extending from inner edges of said peripheral part of said each of said regularly arranged openings of said front surface layer and inner edges of said peripheral part of said corresponding said each of said regularly arranged openings of said back surface layer;
    wherein said at least two of said fibers extend across the virtual space;
    wherein said peripheral part of said each of said regularly arranged openings of said front surface layer includes first sides each consisting of a bundle of first fibers, and said peripheral part of said corresponding said each of said regularly arranged openings of said back surface layer includes second sides each consisting of a bundle of second fibers, with each of said first sides and each of said second sides having a width of more than 0.6 mm, and with each of said at least two of said fibers having a diameter of less than 0.2 mm.

2. The support member according to claim 1, wherein
    said peripheral part of said each of said regularly arranged openings of said front surface layer includes interconnected first sides, with every two of said interconnected first sides defining a first corner,
    said peripheral part of said corresponding said each of said regularly arranged openings of said back surface layer includes interconnected second sides, with every two of said interconnected second sides defining a second corner, and
    each of said at least two of said fibers interconnects one said first corner and either one said second corner or one of said second sides that is opposite said one said first corner across the virtual space, or interconnects one of said first sides and either one said second corner or one of said second sides that is opposite said one of said first sides across the virtual space.

3. The support member according to claim 1, wherein
    said each of said regularly arranged openings of said front surface layer is overlapped with said corresponding said each of said regularly arranged openings of said back surface layer in a plan view, such that more than 70% of an area of said each of said regularly arranged openings of said front surface layer is overlapped with said each of said regularly arranged openings of said back surface layer.

4. The support member according to claim 1, wherein at least one of said at least two of said fibers is curved.

5. The support member according to claim 1, wherein said insect-pest-control component is selected from the group consisting of 2,3,5,6-tetrafluoro-4-methoxymethylbenzyl (1R)-trans-3-(1-propenyl(Z/E=8/1))-2,2-dimethylcyclopropanecarboxylate, and 2,3,5,6-tetrafluoro-4-methylbenzyl (1R)-trans-3-(1-propenyl(Z/E=8/1))-2,2-dimethylcyclopropanecarboxylate.

* * * * *